Dec. 15, 1964     H. F. SCHAEFER, JR     3,161,080
TRANSMISSIONS INCLUDING SELF-ADJUSTING CIRCULAR SPLINES
Filed July 27, 1961     3 Sheets-Sheet 1

*Inventor*
Hans Frederick Schaefer, Jr.
By his Attorney
Carl E. Johnson.

Dec. 15, 1964     H. F. SCHAEFER, JR     3,161,080
TRANSMISSIONS INCLUDING SELF-ADJUSTING CIRCULAR SPLINES
Filed July 27, 1961     3 Sheets-Sheet 2

Dec. 15, 1964  H. F. SCHAEFER, JR  3,161,080
TRANSMISSIONS INCLUDING SELF-ADJUSTING CIRCULAR SPLINES
Filed July 27, 1961  3 Sheets-Sheet 3
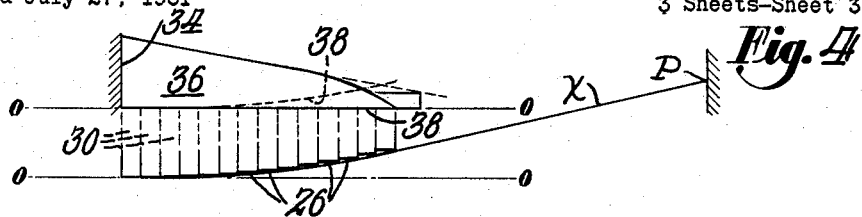
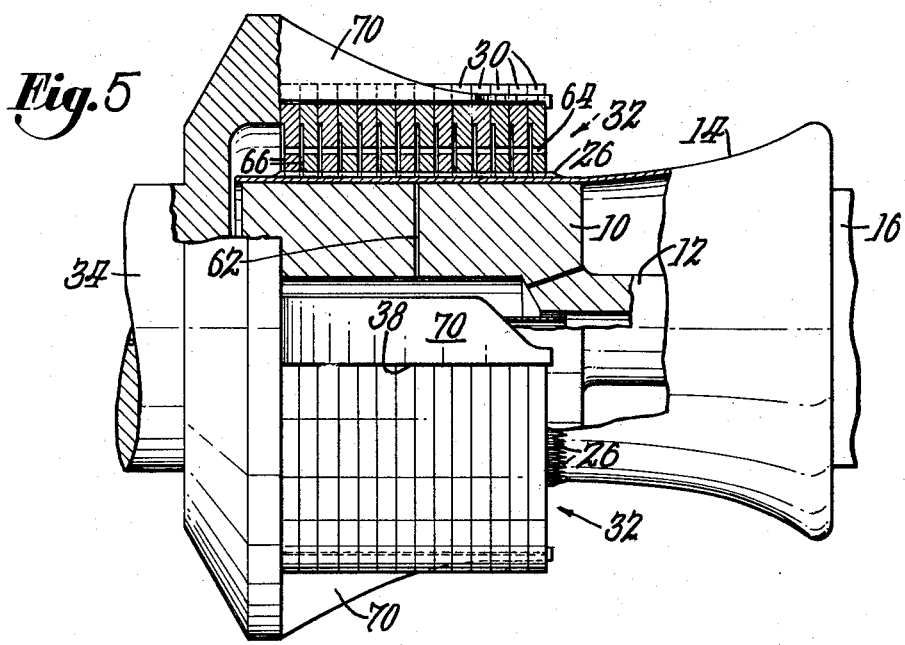
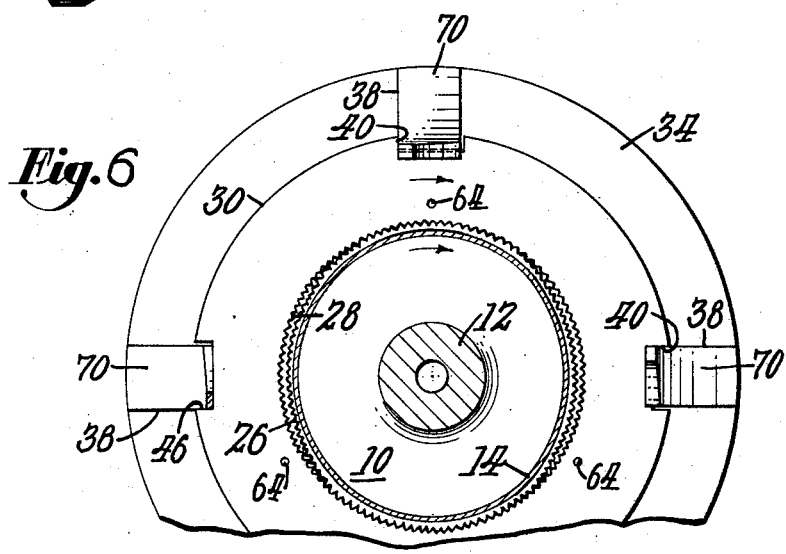

United States Patent Office 3,161,080
Patented Dec. 15, 1964

3,161,080
TRANSMISSIONS INCLUDING SELF-ADJUSTING
CIRCULAR SPLINES
Hans Frederick Schaefer, Jr., Rockport, Mass., assignor to United Shoe Machinery Corporation, Boston, Mass., a corporation of New Jersey
Filed July 27, 1961, Ser. No. 127,368
9 Claims. (Cl. 74—640)

This invention relates to power transmission, and more particularly to mechanisms for effectively coupling rotary input and output members. The invention is herein shown as applied to a high-speed reducer embodying harmonic drive, but it will be appreciated that in various aspects the invention is not thus limited.

It is well known that greater power can be transferred from one toothed member to another in mesh therewith if their teeth have larger areas of contact in which concentration of stress is avoided. When a rotary input member is provided with longer teeth for this purpose it is apparent that their portions closer to the source of power tend to twist and exert an undue share of the driving force on cooperating portions of the driven teeth. This condition usually leads to uneven, excessive wear and shortened gear life. A more critical problem of this nature arises when the input member is tubular and hence more likely to be affected by torsion or "windup." In view of the foregoing it is a primary object of this invention to provide an improved means for coupling rotary, coaxial members whereby the load transmitted will be substantially evenly distributed over the interacting surfaces. Another and more specific objective is to provide an improved means for coupling an output member to the teeth of an input means whereby they will be enabled to carry higher loads for longer periods.

In seeking uniform distribution of working pressure between teeth, one approach has been to provide a rigid circular output member formed with compensated splines, i.e. the latter are preshaped to accommodate deflection due to torsion experienced by the input teeth. This design tends to concentrate load on opposite ends of the latter, respectively, and is subject to the further difficulty that compensation would not be correct for all loads and, moreover, appears to be determinable only from a trial and error procedure which, for many applications, would be unacceptable. Also, flexible, variably compensated splines have been tried, but whether shifted radially or axially, have been attended by unwanted stress concentrations. Accordingly, in fulfillment of the above-mentioned objects, this invention features an output member including axially extending portions designed to deflect under torsion in predetermined manner, and a device rotatably driven by an input means and comprising an axially sectioned, variable or self-compensating circular spline, each section being mounted to receive and transmit approximately the same fraction of the total load from the input to the axially extending portions.

For purposes of illustration the invention is disclosed as applied to coupling the output shaft and input means including a flexible tubular gear of a harmonic drive unit, such application being particularly appropriate in view of the "windup" characteristic to be anticipated in this type of drive and with heavier loads. A harmonic drive, as more fully disclosed, for instance, in United States Letters Patent No. 2,906,143, granted September 29, 1959 on an application of C. W. Musser, essentially comprises a wave generator, a strain gear of flexspline, and a circular spline. Any one of these three elements may constitute an input and another may constitute the output. During operation of the wave generator, which may be elliptoidal or have more than two lobes, teeth of the other two elements are progressively in contact at a plurality of circumferentially spaced points and out of contact and out of mesh at intermediate points, the points of contact corresponding with the number of lobes. Motion is thus transmitted by progressively advancing a controlled deflection wave along the perimeter of a ring. While harmonic drive is advantageous in numerous ways including efficiency and compactness, the present invention affords an opportunity to increase the power output from its tubular input without appreciably increasing size or sacrificing other favorable operating characteristics.

The matter of providing adequate lubrication for high load, high speed transmission is always important and frequently troublesome, especially where there is or may be entrapment of lubricating liquid between cooperating teeth. In the illustrative transmission there is accordingly provided an axially sectioned ring gear having internal teeth, a tubular gear formed with teeth for cooperating with the ring gear, a rotor for radially deflecting the teeth into meshing relation, the rotor having a passageway formed to conduct lubricant to its operating surface, the ring gear having at least one axial bore common to its sections for communicating with the passageway, and one of each of the confronting pairs of faces of the sections being axially recessed to provide ducts radially extending between the bore and the cooperating teeth to relieve the latter of entrapped lubricant.

The above and other features of the invention together with various novel details and combinations of parts will be described in connection with an illustrative embodiment, and with reference to the accompanying drawings thereof, in which:

FIG. 4 is a diagrammatic plan view of a cantilever beam shown in FIGS. 1, 2 and 3 and an element of the tubular, flexible gear as deflected in torsion;

FIG. 5 shows an alternate construction and is a view partly in section and corresponding to FIG. 2, the cantilever beams being shown in an alternate extreme of rectangular shape; and FIG. 6 is a vertical section taken on the line VI—VI of FIG. 5.

The illustrated harmonic drive reducer unit employs a cam or wave generator 10 (FIG. 1) as an input integral with a drive shaft 12. It will be understood that the harmonic drive arrangement is selected only for purposes of apt illustration of the invention, and that the generator 10 may include two or more lobes symmetrically disposed for radially deflecting and rotating a shape (elliptoidal in this case) in a tubular flexspline 14. The latter is preferably shown as bell-shaped since, as disclosed in a copending application Serial No. 108,600, filed May 8, 1961, in my name and that of Frederic B. Jennings, which has matured as Patent No. 3,091,979, tubular members of this configuration allow their toothed portions to incur radial deflection substantially parallel to themselves and thus aid in avoiding load concentrations while permitting the use of any desired tooth length. Merely as rough indication of the characteristics of the particular reducer shown, it may have a flexspline tooth length of 3½", flexspline pitch diameter of about 3.8", an input of about 500 horsepower at a speed of about 53,000 r.p.m., and an output speed of about 1,000 r.p.m.

Figure 1:
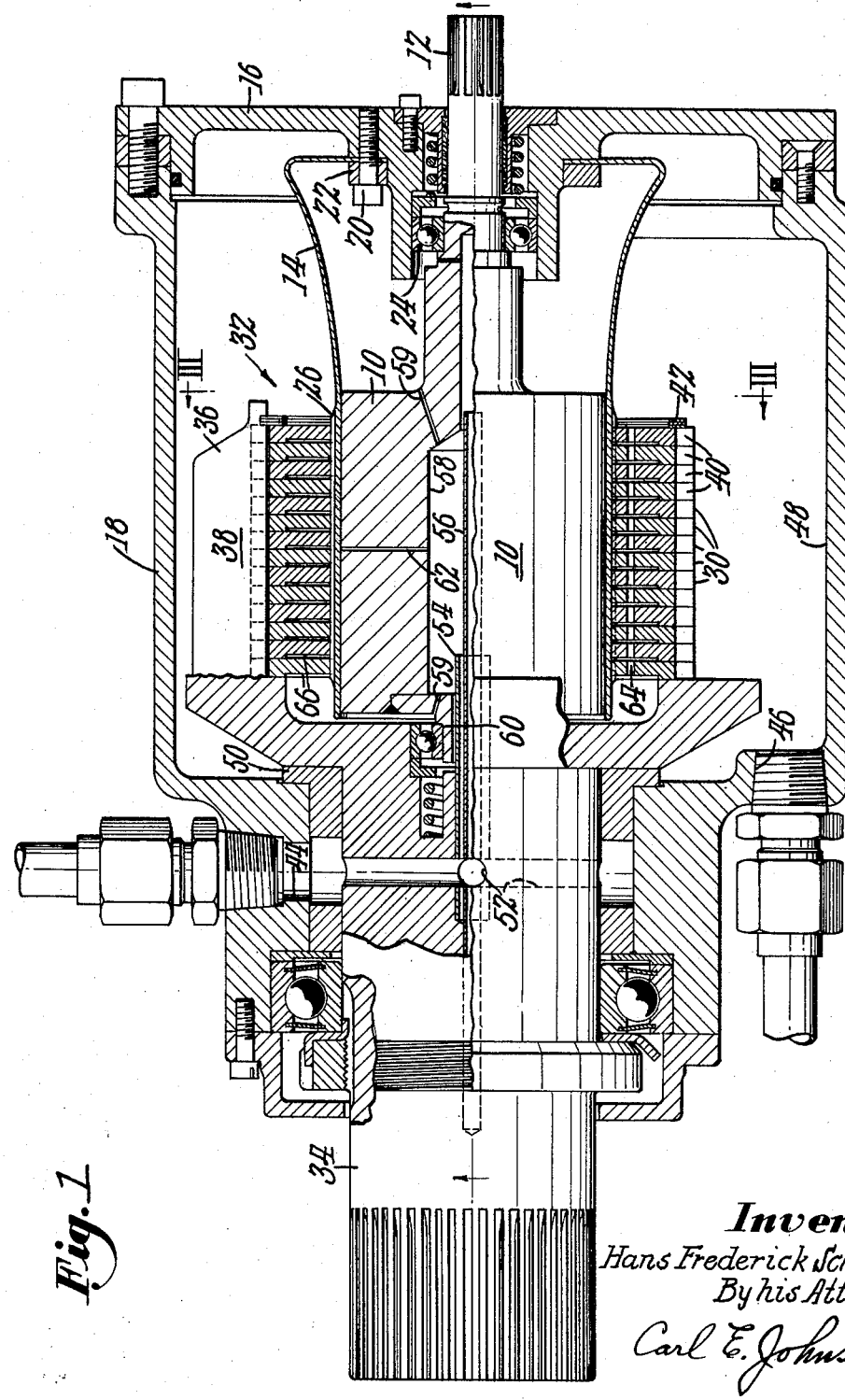
FIG. 1 is an axial section of a harmonic drive type speed reducer incorporating self-adjusting spline mechanism.
Figure 2:
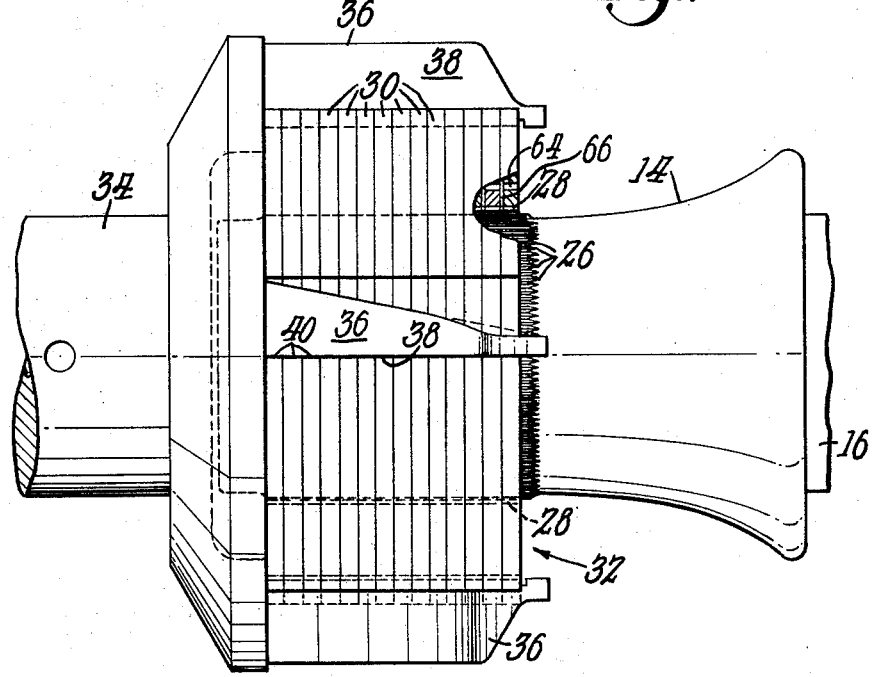
FIG. 2 is a view in elevation indicating cantilever supports for the sectional, self-compensating spline assembly shown in FIG. 1.
Figure 3:
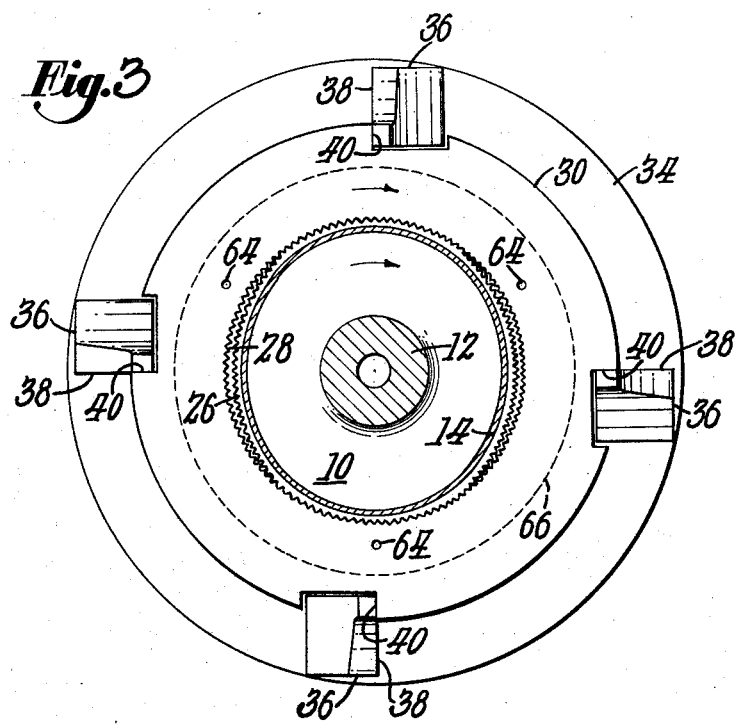
FIG. 3 is a vertical section taken on the line III—III of FIG. 1, snap rings being omitted for revealing tooth engagements.

The flexspline 14 remains rotationally stationary during operation, its inturned flange end being secured to an end plate 16 (FIG. 1) of a housing 18 by means of bolts 20 extending through a clamping ring 22. The shaft 12 is rotatably supported in an axially preloaded bearing 24 within a hub formed on the plate 16. During rotation of the wave generator 10, splined teeth 26 (FIGS. 1-3) formed axially on the flexspline are caused to interact with splined teeth 28 (FIGS. 2, 3) formed internally on a plurality of circular sections 30 of a composite ring gear or circular spline generally designated 32. As customary in harmonic drive design the external circular spline teeth 28 are more in number than those of the flexspline, differing (where a two-lobe wave generator is employed) by two or a multiple thereof, and in fact preferably differing by six in the construction shown in order to permit a reduced pressure angle tooth of 14½° which results in a reduced load on the wave generator 10 as well as lower flexure stress. It will be apparent from the foregoing that, in effect, the wave generator 10 together with the flexspline constitute an input means, and that rotation of the cam shape in the stationary flexspline results in rotating the spline sections 32 in the same direction as the wave generator 10, in this case clockwise as indicated in FIG. 3.

The circular spline sections 30 constitute a self-adjusting power transmitting means between the input means and an output shaft 34 (FIGS. 1, 2) coaxial with the shaft 12. To this end as indicated in FIGS. 2-4, the output shaft has four axially extending, non-rigid, cantilevered portions 36 (FIGS. 2, 3) preferably equi-spaced radially and peripherally with respect to the spline teeth 26. Each of these cantilever portions is of diminishing cross section in one direction and of predetermined shape calculated to yield circumferentially during operation and permit torsional deflection or "windup" of substantially the same character as that to which the spline teeth 26 are subjected. Accordingly, each of the portions 36 has a flat radial face 38, the four faces 38 being 90° apart as shown in FIG. 3, and each of the gear sections 30 being formed with 4 peripheral slots respectively having a radial driving face 40 for transmitting rotative force to at least a portion of the respective faces 38 of the cantilevered portions.

It will be apparent that for a given transmission the number of circular spline sections may be more or less than the 14 in number shown herein, and that their thicknesses in any case will normally be alike. The important consideration is that each section 30 be enabled independently to act transversely of the cantilevered portions, each section exerting substantially the same pressure so that at all times, from zero to full load, the torsional "windup" in the teeth 26 will be commensurately reflected in corresponding torsional deflection in the face 38. This condition is diagrammatically shown in FIG. 4 wherein X represents an element of the flexspline deflected in torsion and extending between its end on the left and a nodal point P on the right. The face 38 is shown as a full straight line corresponding to no-load condition, and also dashed and curved to indicate its deflection due to torsional forces transmitted by the sections 30. The latter have assumed variably compensated positions (angularly about the axis of rotation) in which each is carrying substantially the same load, and harmful stress concentration at any point along the spline teeth 26 is avoided. The sections 30 are axially retained on the cantilevered portions 36 by means of snap rings 42 (FIG. 1). In lieu of employing four cantilevers, it will be understood that two or more may be provided in any particular design as desired.

Properly to lubricate the reducer, the housing 18 is provided with an inlet 44 (FIG. 1) above the output shaft and an outlet 46 communicating with a sump 48 in the base of the housing. Some entering lubricant is fed to a bushing 50 supporting the output shaft 34, but most of the lubricant is conducted by radial holes 52 into two concentric tubes 54, 56 mounted coaxially in the shaft 34. The inner tube conducts lubricant to the bearing 24 via a chamber 58 in the wave generator 10. The outer tube conducts lubricant axially until it may be flung radially outward, some fluid proceeding to lubricate an outboard input shaft bearing 60, and a surplus of lubricant remaining in the chamber 58 at a level determined by drain holes 59 (FIG. 1) in the wave generator. For lubricant accumulating in the flexspline 14, holes (not shown) are drilled in the flexspline which provide a return to the sump. Radial capillary tubes 62 (only one shown in FIGS. 1, 5) in the wave generator allow lubricant to pass from the chamber 58 to the unloaded regions of the wave generator bearing. Leakage from the outboard end of the wave generator together with lubricant from the bearing 60 finds its way through spaced axial bores 64 (FIGS. 1 and 3) in the circular spline 32 and thence to the sump. For lubricating the spline teeth 26, 28 and relieving them of any entrapped lubricant, one face of each section 30 is axially recessed as at 66 (FIGS. 1 and 2) to provide passageways interconnecting the splined teeth and the bores 64.

The cantilever portions 36 are designed torsionally to yield commensurately with the torsional deflection of the teeth 26 as required in order to resist the circular spline sections 30 and enable them respectively to exert their proportionate share of total load. In the reducer shown in FIGS. 1-3 the portions 36 are designed to have diminishing rectangular cross sections, their rate of change of slope relative to their radial faces 38 being determined with respect to distance from their supported ends (their radial dimension largely remaining constant) so as to insure that the load is uniformly distributed throughout their lengths. In FIGS. 5 and 6 the cantilever portions 70 are changed in shape from those designated 36, the design difference being largely one of choice in that each portion 70 has its rectangular cross section diminishing axially from the supported end mainly by reducing the radial dimension and largely maintaining the circumferential dimension constant. It will be understood that other than rectangularly sectioned cantilevers may be employed if desired provided their circumferential displacement is of the character required, i.e., substantially commensurate throughout their length with the torsional deflection of the input splines. In the cantilever configuration shown, the dimension held constant nearer the supported end is rapidly diminished in the vicinity of the unsupported end to provide an added terminal flexibility found desirable. This amounts to a correction which is a slight departure from a mathematically correct form and is adopted for practical purposes.

Though not illustrated herein, it will be understood that a harmonic drive reducer embodying this invention may be of any of the usual variations found in harmonic drive organizations. For instance the arrangement may be of the type wherein the cantilevers are non-rotary, i.e. circularly disposed and attached to the interior of a fixed housing. In this arrangement the flexspline 14, instead of being the rotationally stationary member, is mounted for rotation and allowed to drive an output shaft, flexspline teeth being interengaged as shown herein with the spline teeth of the sectioned ring gear, and each of the ring gear sections being relatively displaceable circumferentially but only as permitted by cantilever deflection.

Having thus described my invention, what I claim as new and desire to secure by Letters Patent of the United States is:

1. A transmission comprising an input means, an axially sectioned ring gear the sections of which are formed with spline teeth for cooperating with different portions of elongated axial splines on the input means, the rotary input means and ring gear being mounted one within the other for relative rotation about a common axis, and an output member comprising circularly disposed cantilevers respectively having axially extending radial faces against which the ring gear sections bear transversely to exert torque, the cantilevers being of a shape adapted to yield similarly, respectively, to torsion thus exerted, and in accordance with torsional deflection of the elongated splines whereby uniformly distributed load is transmitted by the respective ring gear sections.

2. A transmission comprising an input means having splined teeth formed thereon which are subject to torsional deflection, an output member coaxial with the rotary input means and including a supporting portion from which a plurality of axial arms non-rigidly extend in radially spaced relation about said input means, said arms respectively having an axially extending face and cross sections generally diminishing in a direction away from said portion, and means for transmitting drive from the input means to the output member, said drive means including a composite ring gear, the respective sections of which are relatively displaceable circumferentially, the sections being internally formed with teeth for cooperating with corresponding annular portions of the splined teeth and externally formed to bear transversely on said faces of the arms, the latter thus being caused to bend in accordance with the torsional deflection of the teeth to distribute the load axially over their regions of interengagement.

3. A power transmission comprising input means subject to windup distortion due to torsion, a relatively rotatable output member coaxial with said input means, the member having shaped, non-rigid axial portions radially spaced about the input means, the shape of said portions being of generally diminishing cross section in an axial direction to provide substantially uniformly decreasing resistance in that direction to torsional deflection, and a composite power transmitting means in driving engagement with said axial portions and mounted on the input means to derive rotation therefrom, the power transmitting means including a plurality of axially disposed sections respectively adapted to be individually displaced circumferentially by said distortion to apply substantially the same torque load to said shaped portions transversely of said direction.

4. A power transmission comprising an input means having circumferentially disposed, axially extending teeth subject to torsional deflection, a rotary output member having axially extending cantilevered portions spaced radially and peripherally with respect to the input means, said portions having diminishing cross sections in a direction extending from their respective supported ends and thus being increasingly deflectable due to torsion transversely applied along their lengths, and a plurality of circular, axially spaced gears, each of which is relatively circumferentially displaceable and in rotatably driven relation to a different axial portion of said teeth to apply said torsion, the resultant deflection permitted per unit of length of said cantilevered portions being equated substantially to the torsional deflection per corresponding unit of length of said teeth.

5. A power transmission comprising an input means having external spline teeth extending axially, a relatively rotatable output shaft, axially extending cantilevers connected to the output shaft and spaced radially and peripherally with respect to the spline teeth, the latter being increasingly angularly deflectable along their lengths due to torsion when load is applied, and a plurality of relatively rotatable, internally toothed gears respectively in driven relation with successive axial portions of the spline teeth for transmitting rotative force to the output shaft transversely of its cantilevered portions, the latter being adapted to yield, in response to said rotative forces, in circumferential torsional deflection substantially the same in character as that experienced by the spline teeth.

6. A harmonic drive reducer comprising input means including a rotary wave generator and a rotationally stationary flexspline coaxially mounted in telescoping relation thereon, an output shaft having cantilevered portions radially and peripherally spaced about spline teeth axially formed on the flexspline, said portions being of a shape to permit their displacement yieldingly and circumferentially in accordance with corresponding torsional deflection of the spline teeth during rotation of the wave generator under load, and a plurality of coaxial gears meshing with successive axial portions of the spline teeth, each of the gears having radial faces engageable with the cantilevered portions for transmitting, respectively, their proportionate share of the load to said cantilevered portions.

7. A device for axially distributing along an output member the torsion of a spline bearing input member comprising a series of circular, self-adjusting, internally splined gears cooperative with successive axial portions of the input splines, and at least one pair of axially extending, diametrically opposed, deflectable cantilevers fixedly connected to the output member for individual rotative driving engagement therewith of the gears, the cantilevers being of such dimensions that their deflection from non-load condition due to the drive of the gears is substantially commensurate throughout their length with the torsional deflection of the splines as load is transmitted from the input member.

8. For use with a harmonic drive including a wave generator and cooperative tubular flexspline having axial spline teeth, output mechanism comprising a plurality of axially disposed gear sections arranged to be individually acted upon and relatively displaced about the axis of the flexspline by different axial portions of the spline teeth, an output shaft, and non-rigid cantilevers axially extending about the gears for radial inter-engagement therewith at diametrically opposed localities, said cantilevers being integral with the output shaft and adapted to yield circumferentially, due to torsion exerted by the sections, commensurately with torsional deflection experienced by said teeth.

9. In a harmonic drive reducer including a wave generator, a bell-shaped flexspline coaxial therewith, the flexspline being tubular and having external, axial splines subject to torsional deflection and radial displacement, and means for relatively rotating the wave generator and the flexspline to cause a continuous wave of deflection to travel in the latter, the combination of an output member, and a plurality of axially disposed ring gears each in rotary driving engagement with a circumferentially yieldable extension of the member and in driven engagement with different axial portions of the splines, respectively, the yieldability of said member permitting relative circumferential displacement of said ring gears commensurately with the torsional deflection of said splines.

References Cited in the file of this patent

FOREIGN PATENTS 56,713   Netherlands _____ July 15, 1944